(No Model.)
W. B. FARRAR.
ADJUSTABLE VEHICLE SHAFT.
No. 395,820. Patented Jan. 8, 1889.
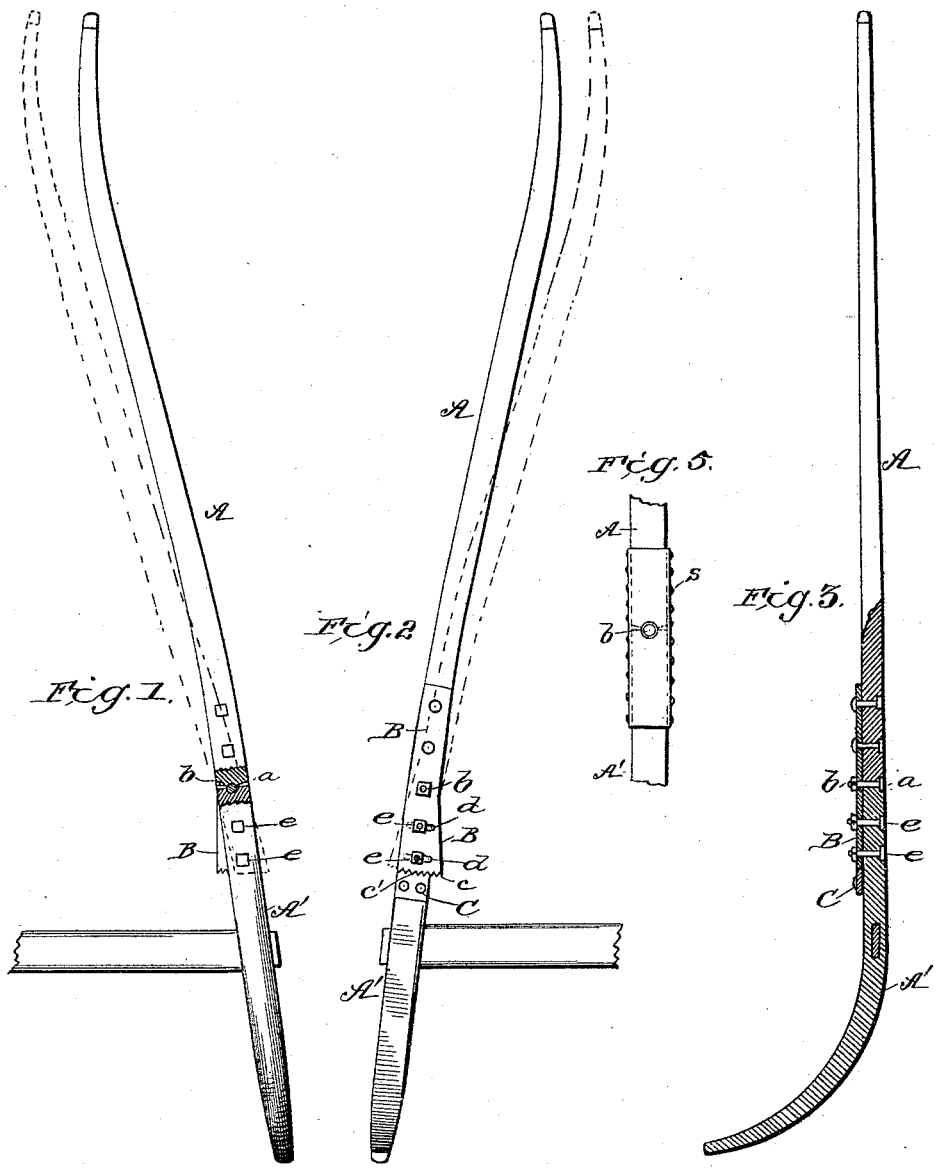
WITNESSES:
INVENTOR:
Wm. B. Farrar
BY Munn &c.
ATTORNEYS.

UNITED STATES PATENT OFFICE.

WILLIAM B. FARRAR, OF GREENSBOROUGH, NORTH CAROLINA.

ADJUSTABLE VEHICLE-SHAFT.

SPECIFICATION forming part of Letters Patent No. 395,820, dated January 8, 1889.

Application filed September 21, 1888. Serial No. 285,960. (No model.)

*To all whom it may concern:*

Be it known that I, WILLIAM B. FARRAR, of Greensborough, in the county of Guilford and State of North Carolina, have invented a new and useful Improvement in Adjustable Vehicle-Shafts, of which the following is a specification.

The object of my invention is to provide a pair of shafts for vehicles which are capable of lateral adjustment to increase or diminish the space between the shafts to adapt them to larger or smaller horses; and it consists in a shaft having a peculiar joint in its length that permits its position to be changed laterally and the shaft tightened up in a new position, as will be hereinafter fully described.

Figure 1 is a top plan view of one of the shafts. Fig. 2 is a bottom plan view. Fig. 3 is a longitudinal section through the joint. Fig. 4 is a detail showing a modification. Fig. 5 is a detail plan view showing the leather casing applied to the joint.

A A' represent the two sections of a single shaft, which in accordance with my invention are formed with a joint at $a$. The end of one shaft-section, A', is square and the end of the other section, A, is splayed where it abuts against A', and directly at the joint is a bolt, $b$, which forms a vertical axis or pintle for the joint to prevent slipping or displacement in changing. On the under side of one of the shaft-sections A, as shown, is rigidly secured by bolts or rivets a metal plate, B, which extends past and forms a splice for the joint. This plate diverges or widens toward the rear from the joint and terminates in a curved end whose curve is struck by a radius from the center of the pintle-bolt. In this wide end of the plate there are two (more or less) transverse slots, $d\ d$, through which there passes two clamp-bolts, $e\ e$, that extend entirely through the rear section, A', of the shaft. The rear curved end of the plate B is notched to form teeth $c$, which mesh with corresponding teeth $c'$, on a plate, C, firmly bolted to the under side of the shaft-section A'. The joint between the two sets of teeth is also an inclined one—*i. e.*, the teeth of the plate B slightly overlap those of plate C, so that when B is tightened up the joint is also tightened.

The object of the plate C is to lock the plate B and hold it against moving laterally after being adjusted.

When the angle of the shaft is to be changed, the bolts $e\ e$ are loosened, and the shaft with plate B is moved laterally about bolt $b$ as a center, the transverse slots $d\ d$ in the plate B permitting this. Then when the proper position has been attained the bolts $e\ e$ are again tightened, and the teeth on the rear end of plate B are tightened in a new position against the teeth of plate C. The plate B thus forms a splice-section for the joint between the two shaft-sections A and A', which plate is firmly held to its adjustment by the clamp-bolts and toothed plate C, to rigidly maintain the shaft in its adjustment to one side or the other.

Both the shafts are designed to be similarly constructed, and by this means the width between the shafts may be adapted to any size of animal, with no risk of looseness or loss of strength.

As a modification of my invention, I may in the place of the plate C use a revolving screw, as shown in Fig. 4, whose threads engage with the teeth on the rear of plate B, and which screw turns in bearings fixed to shaft-section A', and has a squared end to receive a wrench whereby a positive means of adjusting the plate B is provided. I may also, as a further modification, reverse the position of the plate B, so that its wide end shall be to the front. To keep water and mud from getting into the joint of the shafts, I propose to cover the joint with a leather casing, $s$, tacked to the sides of the shaft-sections and resting beneath the head of the bolt $b$, (see Fig. 5,) a suitable washer being placed under the bolt-head to prevent cutting the leather.

I am aware that it is not new to make a shaft in two sections with a transverse joint and a hinge and means for locking the hinge rigid. I am also aware that a vehicle-shaft has been made laterally adjustable by a curved bar at the point where it connects with the cross-bar that carries the singletree, and I do not claim such constructions.

Having thus described my invention, what I claim as new is—

1. A vehicle-shaft having a pivotal joint arranged to work about a vertical axis, in combination with a horizontal splice-plate bolted rigidly to one section of the shaft, and having at its other ends transverse slots and bolts for connecting it to the other section of shaft for lateral adjustment, as described.

2. A vehicle-shaft having a pivotal joint arranged to work about a vertical axis, in combination with a horizontal splice-plate bolted rigidly to one section of the shaft, and having at its other end transverse slots and bolts for clamping it to the other section of the shaft, and a positive locking device fixed upon the latter shaft-section and adapted to engage with the slotted end of the splice-plate, as described.

3. A vehicle-shaft having a pivotal joint arranged to work about a vertical axis, in combination with a horizontal splice-plate rigidly bolted to one section of the shaft and having transverse slots and bolts for clamping it to the other shaft-section, and a serrated or toothed end and a serrated plate fixed to the other shaft-section, having its teeth engaged with the serrated end of the splice-plate, substantially as shown and described.

4. A vehicle-shaft made in two sections, with square and splayed abutting ends, and a pivotal bolt, $b$, in the joint, in combination with a splice-plate, B, and locking devices for the same, substantially as shown and described.

5. A vehicle-shaft having a transverse joint with a splice-plate, combined with a pintle-bolt passing through said joint, and a leather casing placed under the head of the pintle-bolt and tacked to sides of shaft to prevent water and mud from getting in the joint and to make a neat appearance, as shown and described.

WILLIAM B. FARRAR.

Witnesses:
SAML. L. TROGDON,
M. R. TROGDON.